(12) United States Patent
Shepherd et al.

(10) Patent No.: US 10,676,584 B2
(45) Date of Patent: Jun. 9, 2020

(54) BUOYANCY COMPONENT INCLUDING DICYCLOPENTADIENE RESIN

(71) Applicant: Advanced Insulation Limited, Gloucester (GB)

(72) Inventors: Simon Harry Shepherd, Gloucester (GB); David Hamnett, Gloucester (GB)

(73) Assignee: ADVANCED INSULATION LIMITED (GB)

( * ) Notice: Subject to any disclaimer, the term of this patent is extended or adjusted under 35 U.S.C. 154(b) by 257 days.

(21) Appl. No.: 15/769,604

(22) PCT Filed: Oct. 6, 2016

(86) PCT No.: PCT/GB2016/053118
§ 371 (c)(1),
(2) Date: Apr. 19, 2018

(87) PCT Pub. No.: WO2017/068324
PCT Pub. Date: Apr. 27, 2017

(65) Prior Publication Data
US 2018/0305516 A1    Oct. 25, 2018

(30) Foreign Application Priority Data
Oct. 22, 2015   (GB) .................................. 1518745.3

(51) Int. Cl.
| | | |
|---|---|---|
| C08J 9/32 | (2006.01) | |
| B29C 70/66 | (2006.01) | |
| C08K 3/40 | (2006.01) | |
| C08L 65/00 | (2006.01) | |
| C08G 61/08 | (2006.01) | |
| C08J 5/04 | (2006.01) | |
| C08L 25/12 | (2006.01) | |
| F16L 1/24 | (2006.01) | |

(52) U.S. Cl.
CPC ................. *C08J 9/32* (2013.01); *B29C 70/66* (2013.01); *C08G 61/08* (2013.01); *C08J 5/043* (2013.01); *C08L 25/12* (2013.01); *C08L 65/00* (2013.01); *C08G 2261/3325* (2013.01); *C08G 2261/418* (2013.01); *C08J 2365/00* (2013.01); *C08K 3/40* (2013.01); *F16L 1/24* (2013.01)

(58) Field of Classification Search
CPC ......... C08J 9/32; C08J 2365/00; B29C 70/66; C08G 61/08; C08G 2261/3325; F16L 1/24
See application file for complete search history.

(56) References Cited

U.S. PATENT DOCUMENTS

| | | | | |
|---|---|---|---|---|
| 3,622,437 A | * | 11/1971 | Hobaica | ................. B29C 70/66 428/34.5 |
| 5,082,726 A | | 1/1992 | Bastiaens et al. | |
| 6,525,125 B1 | * | 2/2003 | Giardello | ............... A63B 53/04 524/439 |
| 7,285,593 B1 | * | 10/2007 | Giardello | ................ C08F 32/00 524/731 |

FOREIGN PATENT DOCUMENTS

WO         9905447 A1    4/1999

OTHER PUBLICATIONS

International Search Report and Written Opinion for corresponding International Application No. PCT/GB2016/053118, dated Jan. 4, 2017.

* cited by examiner

*Primary Examiner* — Kara B Boyle
(74) *Attorney, Agent, or Firm* — Tarolli, Sundheim, Covell & Tummino LLP

(57) ABSTRACT

A method of forming a buoyancy providing component, the method comprising locating a plurality of macrospheres in a mould, providing a composition including DCPD (dicyclo pentadiene) resin, a ruthenium or osmium catalyst, and a plurality of microspheres, dispensing the composition in liquid form into the mould to encapsulate the macrospheres, and allowing the mixture to set in the mould.

20 Claims, No Drawings

BUOYANCY COMPONENT INCLUDING DICYCLOPENTADIENE RESIN

RELATED APPLICATIONS

The present invention is a U.S. National Stage under 35 USC 371 patent application, claiming priority to Serial No. PCT/GB2016/053118, filed on 6 Oct. 2016; which claims priority of GB 1518745.3, filed on 22 Oct. 2015, the entirety of both of which are incorporated herein by reference.

This invention concerns a method of forming a buoyancy providing component, and a buoyancy providing component.

Buoyancy providing materials and components are required in a wide range of fields. One such field is the oil and gas production industry. Here distributed buoyancy modules are often required which can comprise subsea floats applied to flexible subsea pipelines to provide buoyancy to offset the weight of the products in water. Such floats would be distributed at specific locations along the pipe. Buoyancy may also be provided at other locations.

To date syntactic foams have often been used in such applications. Such foams generally comprise glass or thermoplastic microspheres in an epoxy or polyurethane resin. Epoxy resin has a relatively high viscosity even when mixed with a hardener, which limits the amount of filler i.e. microspheres, which can be contained therein, until the material becomes too viscous to be workable. The setting of epoxy resin is exothermic and tends to have a peak exotherm of over 150° C. This can cause damage if for instance thermoplastic fillers or components are used. The resulting cured syntactic foam usually has a high strength and stiffness but does tend to be brittle.

Polyurethane tends to be a little less viscous than epoxy resins, but still not particularly easy to handle or mix. Also it tends to have a lower exotherm than epoxy resins. However, the resultant syntactic foam is not as strong or stiff as epoxy syntactic foam. This means that it does not reinforce the microspheres as much, such that more individual microspheres may implode if a higher grade of microspheres is not used. Higher grade microspheres though generally have a greater density and therefore provide less buoyancy.

According to a first aspect of the invention there is provided a method of forming a buoyancy providing component, the method comprising locating a plurality of macrospheres in a mould, providing a composition including DCPD (dicyclo pentadiene) resin, a ruthenium or osmium catalyst, and a plurality of microspheres, dispensing the composition in liquid form into the mould to encapsulate the macrospheres, and allowing the mixture to set in the mould.

The mould may form part of the buoyancy providing component, and may form an external shell for the component.

The catalyst may be ruthenium.

The macrospheres may have a diameter of greater than 20 mm, may have a diameter of greater than 40 mm, may be greater than 50 mm, and may have a diameter of approximately 55 mm.

The volume of macrospheres in the component may be greater than 50%, and may be between 50 and 60%.

The macrospheres may have a density of between 0.2 and 0.6 gcm$^{-3}$.

The macrospheres may be formed by injection moulding, and may be formed in two halves which are subsequently bonded together.

The macrospheres may be formed of a glass fibre filled thermoplastic compound, and may be formed of glass reinforced styrene acrylonitrile thermoplastic material.

The internal volume of the macrospheres may be less than 100 cm$^3$, and may be less than 90 cm$^3$.

The microspheres may be glass microspheres.

The microspheres may form between 50 and 70% by volume of the composition.

According to a further aspect of the invention there is provided a buoyancy aiding component, the component being made by a method according to any of the preceding eleven paragraphs.

An embodiment of the present invention will now be described by way of example only.

A distributed buoyancy module component is made as follows. A DCPD resin is mixed with a ruthenium catalyst and between 50 and 70% by volume glass microspheres to form a settable composition. An appropriate glass microsphere would be a Scotchlite® K20 product available from 3M.

A plurality of macrospheres having a diameter of substantially 55 mm, a density of between 0.2 and 0.6 gcm$^{-3}$ and an internal volume of around 87.1 cm$^3$, are located in an appropriately shaped mould. The settable composition is dispensed to encapsulate the macrospheres, such that the macrospheres make up approximately 60% of the volume of the material in the mould. The material is then left to set, such that the component is formed from a plurality of macrospheres in a syntactic foam matrix.

In one arrangement the set material is subsequently removed from the mould. In a further arrangement the mould forms the outer shell of the component, and the material once set is retained in the mould.

The resultant component is found to provide a very high stiffness. This high stiffness allows lighter grades of microspheres to be used, than would be the case with other materials. With the relatively low exotherm during curing of the DCPD, thermoplastic material macrospheres can be used, without substantial damage occurring to them during curing of the DCPD, even with the DCPD being dispensed in a single step. The material used in the component is capable of providing buoyancy at a depth of at least 2000 m subsea without failure. The microspheres are reinforced by the high stiffness DCPD.

The macrospheres are made by injection moulding two hemispheres using glass reinforced styrene acrylonitrile engineering thermoplastic material. The two hemispheres are subsequently bonded together to form a hollow sphere.

There is thus described a buoyancy providing component material usable in forming such components which provides a number of advantages. The use of DCPD relative to for instance epoxy and polyurethane, provides advantages in that it has a lower viscosity making it easier to handle and mix, and also meaning that a larger volume of filler can be provided. The higher volume of filler provides for increased buoyancy meaning that components with greater buoyancy are provided and/or potentially smaller components can be used. This also provides a saving in costs in production, handling and storage etc.

The DCPD is quite workable during production due to its low viscosity, and also has a relatively low exotherm during production, thereby allowing thermoplastic macrospheres to be used which otherwise could be damaged by a higher exotherm, even if the DCPD is dispensed in a single operation.

Various modifications may be made without departing from the scope of the invention. For instance different materials and/or macrospheres could be used other than in the particular example above. The material may be used in other applications. The macrospheres could for instance be made of a different material, and/or formed by a different method.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of forming a buoyancy providing component, the method comprising locating a plurality of macrospheres in a mould, providing a composition including DCPD (dicyclo pentadiene) resin, a ruthenium or osmium catalyst, and a plurality of microspheres, dispensing the composition in liquid form into the mould to encapsulate the macrospheres, and allowing the composition to set in the mould.

2. A method according to claim 1, in which the mould forms part of the buoyancy providing component.

3. A method according to claim 2, in which the mould forms an external shell for the component.

4. A method according to claim 1, in which the catalyst is ruthenium.

5. A method according to claim 1, in which the macrospheres have a diameter of greater than 20 mm.

6. A method according to claim 5, in which the macrospheres have a diameter of greater than 40 mm.

7. A method according to claim 6, in which the macrospheres have a diameter of greater than 50 mm.

8. A method according to claim 7, in which the macrospheres have a diameter of approximately 55 mm.

9. A method according to claim 1, in which the volume of macrospheres in the component is greater than 50%.

10. A method according to claim 9, in which the volume of macrospheres in the component is between 50 and 60%.

11. A method according to claim 1, in which the macrospheres have a density of between 0.2 and 0.6 $gcm^{-3}$.

12. A method according to claim 1, in which the macrospheres are formed by injection moulding.

13. A method according to claim 12, in which the macrospheres are formed in two halves which are subsequently bonded together.

14. A method according to claim 1, in which the macrospheres are formed of a glass fibre filled thermoplastic compound.

15. A method according to claim 14, in which the macrospheres are formed of glass reinforced styrene acrylonitrile thermoplastic material.

16. A method according to claim 1, in which the internal volume of the macrospheres are less than 100 $cm^3$.

17. A method according to claim 16, in which the internal volume of the macrospheres is less than 90 $cm^3$.

18. A method according to claim 1, in which the microspheres are glass microspheres.

19. A method according to claim 1, in which the microspheres form between 50 and 70% by volume of the composition.

20. A buoyancy aiding component, the component being made by locating a plurality of macrospheres in a mould, providing a composition including DCPD (dicyclo pentadiene) resin, a ruthenium or osmium catalyst, and a plurality of microspheres, dispensing the composition in liquid form into the mould to encapsulate the macrospheres, and allowing the composition to set in the mould.

* * * * *